United States Patent
Chuksin et al.

[11] Patent Number: 5,974,772
[45] Date of Patent: Nov. 2, 1999

[54] SYSTEM FOR HARVESTING CROPS BY COMBING

[75] Inventors: Petr Ivanovich Chuksin, Minsk; Nikolai Andreevich Shpakovsky, Minsky r-n; Alexandr Timofeevich Golanov, Novopolotsk, all of Belarus; Leonid Nikolaevich Molotkov; Mikhail Vasilevich Kuznetsov, both of Tula, Russian Federation; Vasily Ivanovich Losev; Alexandr Ivanovich Skuratovich, both of Minsk, Belarus

[73] Assignee: Ingemar Bjurenvall, United Kingdom

[21] Appl. No.: 08/836,411

[22] PCT Filed: Oct. 23, 1995

[86] PCT No.: PCT/BY95/00006

§ 371 Date: Apr. 22, 1998

§ 102(e) Date: Apr. 22, 1998

[87] PCT Pub. No.: WO96/12400

PCT Pub. Date: May 2, 1996

[30] Foreign Application Priority Data

Oct. 25, 1994 [BY] Belarus .......................................... 2499

[51] Int. Cl.⁶ .................................................. A01D 41/06
[52] U.S. Cl. ................................ 56/128; 56/220; 56/364
[58] Field of Search ............................. 56/364, 128, 130, 56/220, DIG. 19, DIG. 20

[56] References Cited

U.S. PATENT DOCUMENTS

| | | |
|---|---|---|
| 1,370,919 | 3/1921 | Schaefer . |
| 1,449,869 | 3/1923 | Novak . |
| 4,587,799 | 5/1986 | Thomas et al. . |
| 4,951,451 | 8/1990 | Klinner .................. 56/128 X |
| 4,951,453 | 8/1990 | Klinner . |
| 5,036,653 | 8/1991 | Klinner . |
| 5,044,127 | 9/1991 | Klinner .................. 56/128 X |
| 5,111,654 | 5/1992 | Sertich . |
| 5,175,984 | 1/1993 | Hale et al. . |
| 5,185,991 | 2/1993 | Klinner . |
| 5,193,331 | 3/1993 | Quandt . |

FOREIGN PATENT DOCUMENTS

| | | |
|---|---|---|
| 0 067 104 | 12/1982 | European Pat. Off. . |
| 0 199 637 | 10/1986 | European Pat. Off. . |
| 0 195 810 B1 | 11/1991 | European Pat. Off. . |
| 1667090 A1 | 7/1991 | Russian Federation . |
| 1837737 A3 | 8/1993 | Russian Federation . |
| 1142033 | 2/1985 | U.S.S.R. . |
| 1186116 | 10/1985 | U.S.S.R. . |
| 1550644 A1 | 7/1988 | U.S.S.R. . |
| 1648275 A1 | 5/1991 | U.S.S.R. . |
| 2 200 026 | 7/1988 | United Kingdom . |
| 2 208 582 | 4/1989 | United Kingdom . |
| 2 209 653 | 5/1989 | United Kingdom . |
| 2 209 654 | 5/1989 | United Kingdom . |
| WO 86/01972 | 4/1986 | WIPO . |
| WO 89/11784 | 12/1989 | WIPO . |

*Primary Examiner*—H. Shackelford
*Attorney, Agent, or Firm*—Harness, Dickey & Pierce, P.L.C.

[57] ABSTRACT

The object of the invention is to reduce crop wastage and to simplify the design of the combing unit. The essence of the invention lies in the fact that in the combing unit, the teeth of the working combing element are arranged in rows in the direction of travel, and the upper rim of the front wall of the receiving chamber takes the form of resilient teeth whose ends are located between the lateral edges of the teeth of the working combing element; the angle of inclination of the front wall of the receiving chamber to the horizontal plane is greater than the natural slope angle of a heap of cereal, leguminous crops and grass seeds.

2 Claims, 2 Drawing Sheets

SYSTEM FOR HARVESTING CROPS BY COMBING

FIELD OF THE INVENTION

This invention relates to the agricultural machinery industry, specifically, to systems used for harvesting standing crops by combing.

PRIOR ART

In combing units, one of the places where harvested grain wastage occurs is the zone in which the heap goes down the working combing element and the combed mass is then moved by the working conveying elements. The proposed invention is aimed at solving the given problem.

In combing the plants by combing units provided with active working elements, the stalk break mainly occurs at the base of the ear, panicle or bean where the stalk has the minimum section, however, a certain portion of plants gets broken in the other weakened places of the stalk. The long, broken portions of stalks are simultaneously caught on several rows of the combing teeth and, as a rule, poorly go down the teeth of the working combing element, which results in the stalk winding on it. Besides, the stalks hang over the receiving-chamber rim and are dumped onto the field surface, which causes additional wastage.

The long, broken portions of stalks are simultaneously caught on several rows of combing teeth and, as a rule, poorly go down the working combing-element teeth, which results in the stalk winding on the working combing element. Besides, the stalks hang over the receiving-chamber rim and are dumped onto the field surface, which causes additional wastage. To prevent the stalk from winding, ensure stalk removal from the combing teeth and prevent the heap hanging over the receiving-chamber rim, use is made of the various removal devices.

Known in the present state of art is the unit for combing standing plant seeds (USSR Inventor's Certificate No. 1648275, IPC(5): AOID 41/08), comprising the combing drum with teeth, the fan located inside the drum, with the pipeline being installed behind them, and the rotary brushes for cleaning the teeth.

The disadvantages of such a combing unit are, first, the disturbance of the production process because of winding of the stalks on the brushes and, second, the complexity of the design of the combing drum accommodating the rotary fan with fixed guard; the drum, fan and brushes have different speeds and direction of rotation. Besides, the power intensity of pneumatic devices is higher than that of mechanical devices.

Known in the present state of art is the combing unit for harvesting agricultural standing plants (USSR Patent No. 1812926, IPC(5): AOID 41/08), comprising the combing drum closed from above and on the sides with the casing, with the trough located in close proximity of the teeth of the drum, in its rear section; the trough accommodates the auger for the lateral movement of the combed mass.

The disadvantage of such a unit is the fact that it is impossible to arrange in the optimum way the combing drum and collecting chamber for heap, formed by the side members, roof and trough with auger. To ensure heap collection and avoid wastage, it is necessary to provide certain relation between the auger diameter and distance from the upper rim to the trough bottom (the trough depth). To ensure a more efficient retrieval of the combed heap, it is necessary to arrange the rim of wall 9 (FIGS. 1 through 10 of the patent) as low as possible, but in this case, the auger is arranged in the very shallow trough, and since it rotates opposite to the combing drum, the heap is thrown over to the drum which dumps the heap onto the field surface. The attempts to deepen the trough on the account of its lowering below the combing drum result in the fact that the trough bends down the stalks of the combed plants and brings them from the operative zone of the combing-drum teeth, especially on the lodged plant stand.

The value of angle of inclination of the trough front rim is also not determined in this combing unit, though the value of this angle has a significant effect on collection and transportation of the heap. Besides, when the trough design provides for the rigid upper rim of the trough front wall, the combed plant stalks hang over this rim and get accumulated thereon after which they are caught by the drum teeth and dumped onto the field surface.

According to the information available, numerous attempts to create a similar construction have failed to obtain positive results due to the high wastage of the combed mass. The combing-unit construction close to that shown in FIGS. 10, 68 of the mentioned patent has proven to be serviceable. In the given variant of the unit construction, for removal and active withdrawal of the heap from the combing drum and prevention of the combed stalks hanging over the trough rim, the trough with auger is brought backward from the combing drum, whereas the longitudinal belt conveyor serves as a removal and withdrawal device.

This construction is available from the British firm "Shelbourne Reynolds" which manufactures a number of combing headers with a covering width ranging from 2.8 to 6.0 meters for harvesters of various types.

At the same time, proceeding from tests of header SR-4200 at the West Minsk Test Station in 1990, the combing unit is unserviceable for harvesting long-stalked lodged plants since the stalks are wound on the combing drum, i.e. the conveyor fails to ensure active cleaning of the drum in such conditions.

The remover construction in the form of a conveyor is complicated and metal-intensive, its practical use leads to an increase in the overall dimensions of the combing unit, not ensuring the unit serviceability under unfavourable harvesting conditions.

According to the design, the closest to the proposed invention is the standing crop-combing unit (USSR Inventor's Certificate No. 1550644, IPC(5): AOID 41/08) (the prototype), comprising the casing, roof, combing conveyor with teeth, stalk-feed device adjustable in height with the aid of the hydraulic cylinder and the trough with auger, with the beater being installed over the trough front rim. During operation of the stalk-feed device, the drum equalizes the plant-stand tiers and brings the plant-ear portion into the combing chamber formed by the drum surface, roof front wall and combing conveyor. The plants are combed here: the conveyor teeth tear the top-ear portion off the plants and throw the heap into the trough.

To remove the stalks not thrown from the combing machine teeth and prevent stalks from hanging over the trough wall, the blade beater is introduced into the combing-machine construction and installed over the trough front-wall rim. The beater blades move at a speed higher than that of the conveyor teeth due to which the conveyor picks up the stalks from the combing teeth and throws them into the receiving chamber. The beater makes it possible to lift the front rim of the receiving chamber higher without worsening the conditions for the heap going down the working combing-element teeth.

The prototype has a number of disadvantages dictated by its construction.

1. The teeth which are installed in a disordered way on the conveyor belt pinch the stalks during the break in several places in height which significantly increases the probability of the stalk breaking in its middle or lower parts. This increases the straw content in the combed heap and leads to the stalks moving downward from the combing teeth in an unsatisfactory manner.
2. The value of angle of inclination of the trough leading edge is not determined in the prototype either, though the value of this angle has a significant effect on the collection and transportation of the heap.
3. Since the clearance is provided between the combing conveyor-tooth ends and the beater blades which ensures their functioning without collisions, the stalks which do not or poorly project beyond the tooth-end trajectory do not reach the operative zone of the beater and are not delivered to the receiving chamber but are thrown out on the field, creating wastage. Besides, stalks getting on the leading edge of the receiving chamber are dumped onto the field surface by the beater.
4. The high-speed beater introduced into the combing-unit construction significantly complicates the combing-machine construction, especially the combing-machine drive construction. The analysis of the analogues and prototypes shows that ensuring the adequate release of the working combing-element teeth from the heap and exclusion of the combed mass carrying-out of the receiving chamber plays the most important part in the prevention of grain wastage. Specifically, for the combing units provided with the mechanical collection and movement of the heap, we formulated the following contradiction: the low arrangement of the receiving-chamber trough leading edge ensures the adequate conditions for releasing the working combing element, but in this case, the auger throws the heat over the low wall of the trough, creating wastage. The high rim decreases the wastage caused by the heap throwing-over by the auger, but impairs the working combing-element release. This contradiction is solved by arranging the trough rim at the required height, whereas the indicated disadvantages are eliminated by using the active removers of the heap (the beater, conveyor, etc.).

However, the use of such units cannot completely eliminate the wastage, significantly complicating the combing-unit construction, creates a number of other problems.

DISCLOSURE OF THE INVENTION

The object of the proposed invention is to reduce crop wastage and to simplify the combing-unit design. The indicated object is accomplished due to the fact that in the proposed system for harvesting the crops by combing, comprising the casing, working combing-element with teeth, roof, auger and trough whose front-wall edge is arranged in close proximity of the combing element rear section, the working combing element teeth are arranged in rows in the direction of travel, and the upper rim of the trough front wall is made from resilient material.

In this case, the resilient rim of the trough front wall is made in the form of teeth whose ends are located between the working combing-element tooth edges. Besides, the angle of inclination of the collecting-chamber trough front wall to the horizontal plane is greater than the natural slope angle of a heap of cereal, leguminous crops and grass seeds.

BRIEF DESCRIPTION OF THE DRAWINGS

The essence of the invention is explained by graphic materials.

Figure 1:
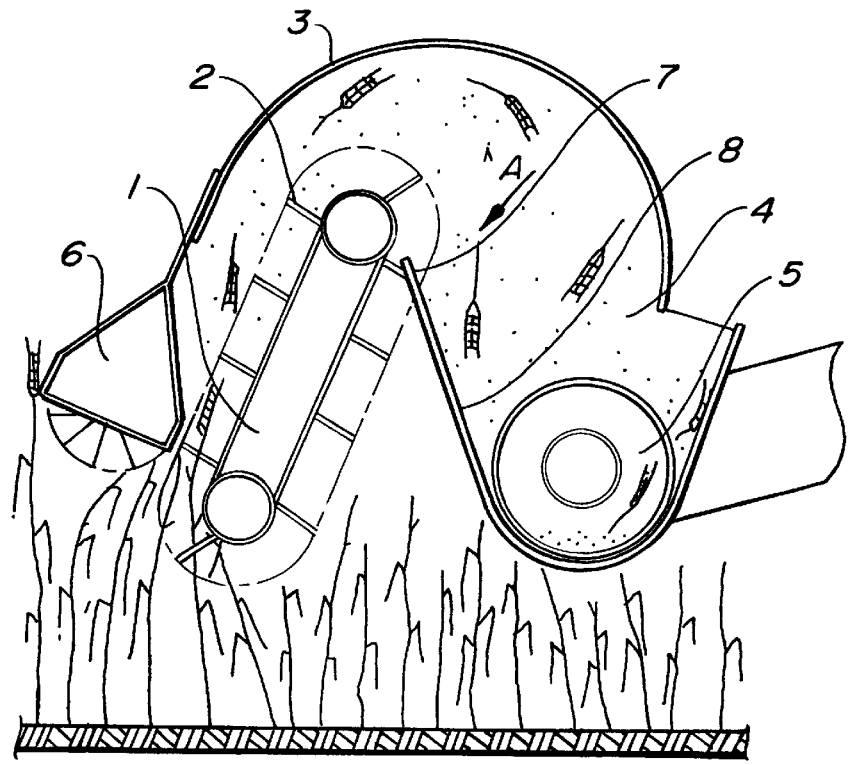
FIG. 1 illustrates the combing unit with the working combing element in the form of a conveyor.

The unit comprises working combing element 1 made in the form of a two-shaft conveyor (FIG. 1) or a drum (FIG. 2) mounting teeth 2, roof 3 and trough 4 accommodating auger 5. In this case, the teeth of the working combing element are arranged in rows in the direction of travel. Stalk-feed device 6 may be installed in front of the working combing element. The collecting-chamber front-wall upper rim is made from resilient material in the form of teeth 7 arranged between the rows of the working combing-element teeth with their mutual overlapping. The resilient teeth are attached to trough front rim 8 with the aid of cover plate 9 and screws 10.

The combing unit functions as follows. The aggregate comprising a combing unit and, for example, a grain harvester moves over the field. Working combing element 1 is set in motion so that its teeth 2, moving from the bottom to the top, comb the plant stand and separate the top-ear portions of the plants from their stalks. The teeth slip over the stalk-straw portion, acting directly on the ear and picking the stalk of the minimum length. A certain portion of the heap moves downward from the teeth directly at the moment of picking, is thrown up, rebounds from roof 3 and gets into trough 4 of the receiving chamber. The remaining stalks are caught by the teeth and transported upward, dropping from the teeth on account of the centrifugal force and also, rebounding from roof 3, get into receiving chamber trough 4, onto auger 5.

The separate stalks caught on the working combing element teeth get on teeth 7 of the upper rim of trough front wall 8. During interaction of the movable and fixed teeth by means of the stalks getting between the teeth, the collecting-chamber teeth vibrate since the trough front-wall upper rim is made from resilient material. The stalks caught by the remover teeth on account of the vibration of the latter and optimum angle of inclination of the trough wall, are dumped onto the receiving-chamber bottom, in the auger operative zone. The auger moves the heap to the unit middle section and delivers the heap to the subsequent transporting and threshing working elements.

The prototype and herein-proposed invention have the following similar essential features:

the casing serving for installation of the working elements on it;

the working combing unit with teeth ensuring the standing crop combing;

the roof ensuring the required direction of movement of the combed heap;

the receiving chamber trough serving for collection of the heap, whose front wall rim is installed behind the working combing element, in close proximity of it;

the auger for the lateral movement of the heap to the other transporting working elements;

the stalk-feed device ensuring the stalk feed to the combing chamber;

the working element drive.

As compared to the prototype, the herein-proposed invention has the following characteristic features:

1. The working combing-element teeth are arranged in such a way that the similar teeth of the rakes followed one after another move along the same trajectories.

2. The upper rim of the trough front wall is made resilient in the form of resilient teeth whose ends are located between the working combing-element tooth edges.

3. The angle of inclination of the receiving-chamber trough front wall to the horizontal plane is made greater than the natural slope angle for the stalks of the cereal, leguminous crops and grass seeds, which prevents the heap from overhanging.

4. The use of the resilient rim of the trough front wall with the teeth passing between the teeth of the working combing element enables one to employ the receiving-chamber trough whose depth is 1.2 to 1.5 times greater than the auger diameter in the combing units.

5. The construction of the remover with resilient teeth makes it possible to employ it in the combing units provided with the working elements of the conveyor and drum types.

The distinguishing features indicated ensure the achievement of the new technical results:

The arrangement of the working combing-unit teeth in such a way that the similar teeth of the rakes following one after another move along the same trajectories, enables one to gain a positive effect: during the combing process, the stalks bend to a lesser degree and they are torn off directly at the ears, which decreases the straw volume in the heap (the new technical result).

The arrangement of the working combing element teeth in such a way that the similar teeth of the rakes following one after another move along the same trajectories, is known in the analogue (column 8, the last but one paragraph from below), but there:

it is not mandatory condition (column 8, the last but one paragraph from below, column 10, the fourth paragraph from above);

it is used for carrying out completely different functions;

it fails to give the sum of positive effects available in the herein-proposed construction.

Apart from this, such an arrangement of the working combing-element teeth makes it possible to make the trough front-wall upper rim in the form of resilient teeth whose ends pass between the working combing-element teeth, avoiding their collision in the process of operation. The interaction of teeth of the upper rim and working combing element in the process of operation makes it possible to decrease heap wastage by solving the following problems: the first problem—ensuring the removal of the stalks stuck between the teeth (the new technical result), the second problem—decreasing the slit between the trough rim and the working combing-element surface (the new technical result) and the third problem—preventing the wrapping of the remover teeth proper in the heap taken from the combing machine (the new technical result).

It is worth noting that the rim self-cleaning is carried out due to interaction of the movable and fixed teeth by means of stalks getting between the teeth: the trough-rim teeth continuously vibrate since the collecting-chamber front-wall rim is made from resilient material. The stalks taken from the combing teeth by the receiving-chamber remover teeth are dumped onto the bottom into the auger operative zone due to vibration of the teeth and the optimum selected angle of inclination of the rough wall.

The employment of the trough front-wall upper rim in the form of resilient teeth whose ends pass between the working combing-element teeth enables one to ensure the removal of the stalks stuck between the teeth. This makes it possible to considerably build up the trough front rim so that the depth of the trough is 1.2 to 1.5 times greater than that of the auger diameter, which does not result in the increase of combed heap wastage because of the poor dropping of the stalks from the teeth. The trough-depth increase enables one to reduce the wastage caused by the heap throwing by the auger over the trough wall to the working combing element when the working combing elements of both conveyor and drum types are used (the new technical result).

All stated here testifies to the fact that the interrelation occurs between the characteristic features and technical results.

As far as the applicants' knowledge is concerned, a combination of essential features characterizing the essence of the invention is not known from the prior art and hence the present invention fully complies with the NOVELTY criterion.

The essence of the herein-proposed invention is not quite obvious for those skilled in the art from the known state of the art. A combination of features characterizing the known units fails to provide the achievement of the new properties and only the presence of the respective characteristic features enables one to obtain the new properties, the new technical result. Hence, the proposed system fully complies with the INVENTIVE STEP criterion.

BEST METHOD OF CARRYING OUT THE INVENTION

Figure 2:
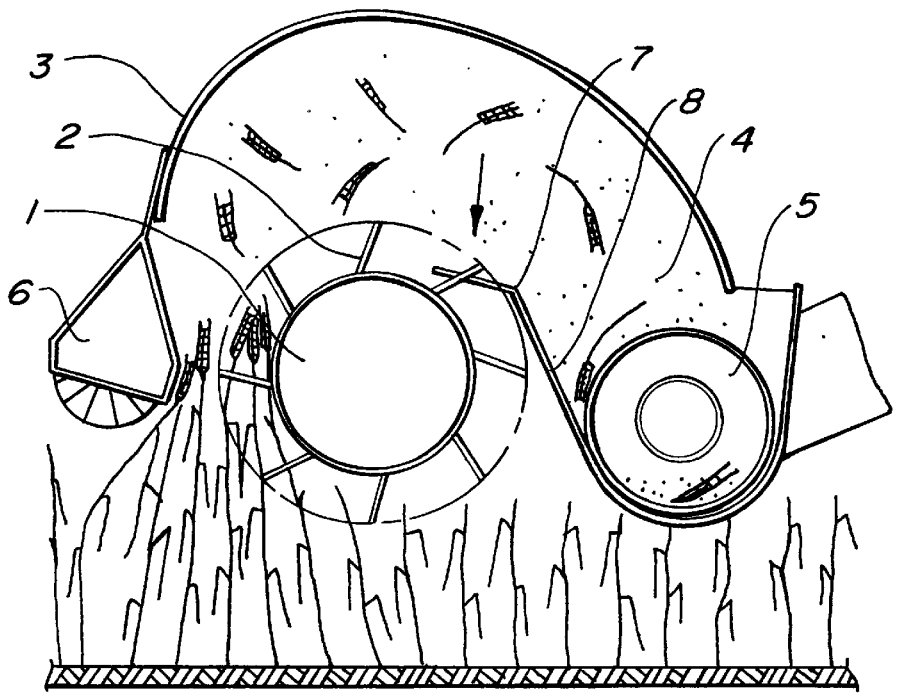
FIG. 2 illustrates the same unit with the working combing element in the form of a drum.
Figure 3:
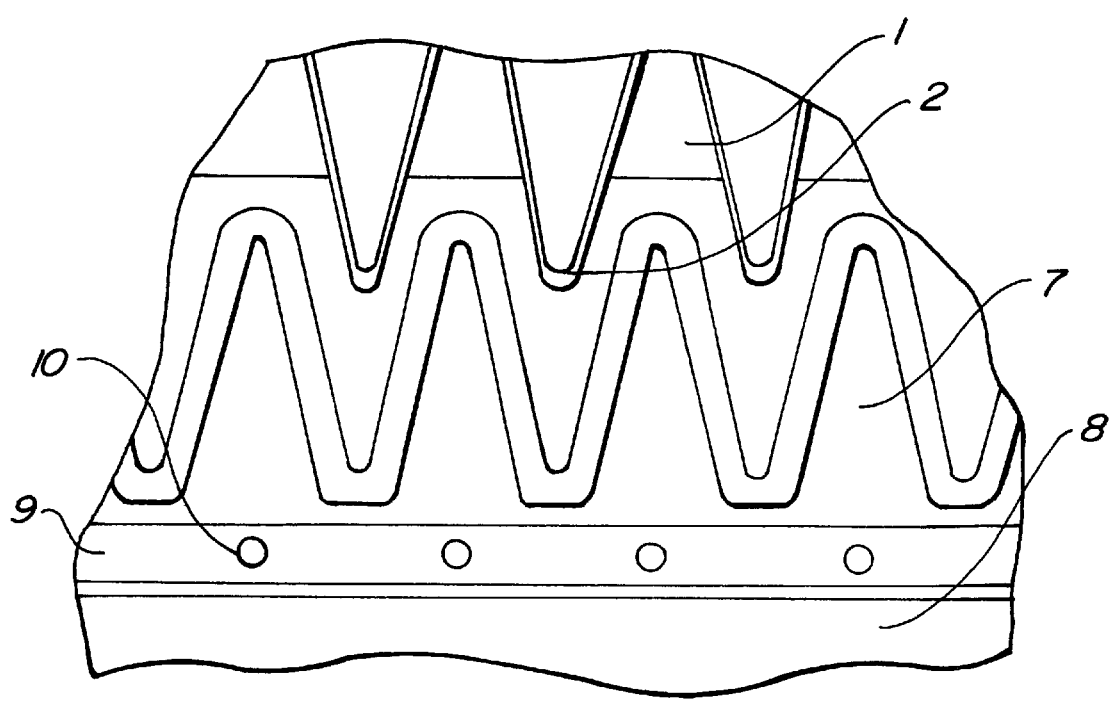
FIG. 3 illustrates the top view of the trough front-wall upper rim and working combing element.

FIG. 1 illustrates the combing unit with the working combing element in the form of a conveyor, FIG. 2 illustrates the same unit with the working combing element in the form of a drum, FIG. 3 illustrates the top view of the trough front-wall upper rim and working combing element.

The unit comprises working combing element 1 made in the form of a two-shaft conveyor (FIG. 1) or a drum (FIG. 2) mounting teeth 2, roof 3 and trough 4 accommodating auger 5. In this case, the teeth of the working combing element are arranged in rows in the direction of travel. Stalk-feed device 6 may be installed in front of the working combing element. The collecting-chamber front-wall upper rim is made from resilient material in the form of teeth 7 arranged between the rows of the working combing-element teeth with their mutual overlapping. The resilient teeth are attached to trough front rim 8 with the aid of cover plate 9 and screws 10. The combing unit functions as follows. The aggregate comprising a combing unit and, for example, a grain harvester moves over the field. Working combing element 1 is set in motion so that its teeth 2, moving from the bottom to the top, comb the plant stand and separate the top-ear portions of the plants from their stalks. The teeth slip over the stalk-straw portion, directly acting on the ear and picking the stalk of the minimum length. A certain portion of the heap moves downward from the teeth directly at the moment of picking, is thrown up, rebounds from roof 3 and gets into trough 4 of the receiving chamber. The remaining stalks are caught by the teeth and transported upward, dropping from the teeth on account of the centrifugal force and also, rebounding from roof 3, get into receiving-chamber trough 4, onto auger 5.

The separate stalks caught on the working combing-element teeth get on teeth 7 of the upper rim of trough front wall 8. During interaction of the movable and fixed teeth by means of the stalks getting between the teeth, the collecting-chamber teeth vibrate since the trough front-wall upper rim is made from resilient material. The stalks delayed by the remover teeth, on the account of the vibration of the latter and optimum angle of inclination of the trough wall, are dumped onto the receiving-chamber bottom, in the auger operative zone. The auger moves the heap to the unit middle section and delivers the heap to the subsequent transporting and threshing working elements.

INDUSTRIAL APPLICABILITY

The practical use of the proposed system for harvesting crops by combing ensures effective cleaning of the combing teeth of stalks, prevents their accumulation on the trough wall and decreases the clearance between the trough-wall rim and the working combing element, which makes it possible to decrease heap wastage.

We claim:

1. A system for harvesting crops by combing, comprising a casing, said casing including a roof, a combing element with first teeth, and rotatable about a rotation axis, said teeth having edges, an auger and a crop collecting trough having a front wall defining a trough rim which is arranged in close proximity to the first teeth wherein the first teeth are arranged in rows around the circumference of the combing element, said rows extending in a plane perpendicular to said axis of rotation of said combing element, so that an individual tooth travels directly behind another tooth as it revolves around the combing element, said trough rim being made from resilient material, and the trough rim being made in the form of second teeth extending upwardly from said front wall, said second teeth having ends arranged between the edges of the first teeth.

2. A combing unit according to claim 1, wherein the angle of inclination of the front wall of the crop collecting trough to the horizontal plane is, in use, greater than the natural angle of repose of the crop being harvested, and wherein the crop being harvested is a cereal, leguminous crop or grass seeds.

* * * * *

UNITED STATES PATENT AND TRADEMARK OFFICE
CERTIFICATE OF CORRECTION

PATENT NO. : 5,974,772
DATED : November 2, 1999
INVENTOR(S) :
Chuksin et al

It is certified that error appears in the above-identified patent and that said Letters Patent is hereby corrected as shown below:

Column 7, line 10, Claim 1, "clement" should be --element--.

Signed and Sealed this

Twenty-first Day of November, 2000

Attest:

Q. TODD DICKINSON

*Attesting Officer*          *Director of Patents and Trademarks*